Figure 1:
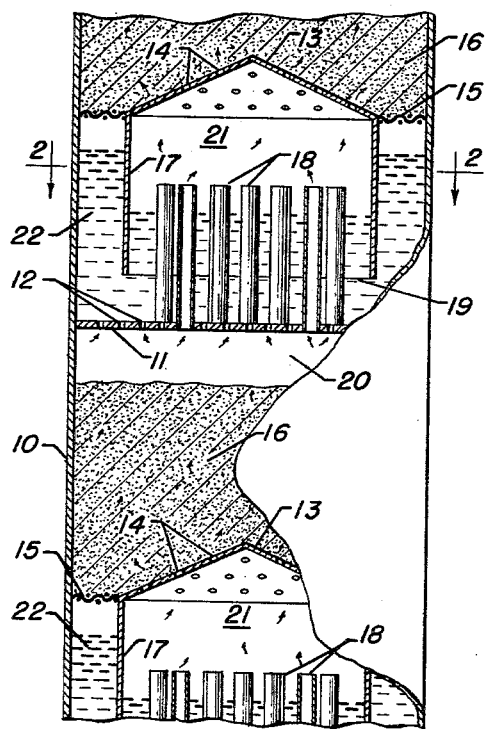

July 20, 1965

L. C. HARDISON

APPARATUS FOR CONTACTING MIXED PHASE
FLUIDS WITH A SOLID CATALYST

Filed March 26, 1962

3,195,987

INVENTOR:
Leslie C. Hardison

BY: Chester J. Giuliani
Philip T. Liggett
ATTORNEYS 3,195,987
APPARATUS FOR CONTACTING MIXED PHASE FLUIDS WITH A SOLID CATALYST
Leslie C. Hardison, Arlington Heights, Ill., assignor to Universal Oil Products Company, Des Plaines, Ill., a corporation of Delaware
Filed Mar. 26, 1962, Ser. No. 182,591
6 Claims. (Cl. 23—288)

This invention relates to a countercurrent flow catalytic reactor specifically adapted to accommodate liquid phase or mixed phase reactants, that is, reactants the body of which is present in both liquid and gaseous states under reaction conditions. The invention is more particularly directed to a distributor assembly for such reactor which promotes efficient contact between reactants and catalyst.

There are numerous commercial processes involving the contracting or fluid reactants with a confined bed of catalysts particles wherein the conditions of temperature and pressure are such, in relation to the charge stock, that the charge is substantially unvaporized or is otherwise incompletely vaporized. Typical processes of this nature include hydocracking of heavy oil, hydrogenation of vegetable oil, hydrodesulfurization of middle distillates, and crude oil cleanup. In addition to the unvaporized or partially vaporized charge, the reaction is frequently carried out in the presence of extraneous gas such as hydrogen in the case of hydrotreating processes or light hydrocarbons or inert gases in the case of combination denitrogenation-stripping operations. Considerations of space velocity and residence time usually require that the reaction path through the catalyst bed be elongated in the direction of fluid flow. Conventional catalytic reactors for this service generally take the form of vertically elongated vessels employing upflow or downflow of reactants through the catalyst bed contained within it.

In practice, however, it has been found extremely difficult, if not impossible, to achieve uniform contact between liquid and catalyst or between liquid and gas when charging a liquid or mixed phase stream to conventional reactors of the class described. There is a strong propensity for the liquid phase to become randomly dispersed in the catalyst bed and to develop channeled flow paths therethrough, thus avoiding the desired degree of contact with both catalyst and gaseous phase. Such operational deficiency is manifested, inter alia, by poor conversions per pass, low yields excessive coke deposition on the catalyst.

It is an object of the present invention to provide a novel fluid-solid contacting apparatus for the catalytic treatment of liquid or mixed phase charge stocks, which apparatus is designed to promote uniform distribution and wherein the gaseous phase is passed upward through the apparatus countercurrent to a downward flow of liquid phase of both liquid and gas throughout the catalyst mass. The countercurrent flow as between liquid and gas enables higher conversions and better product purities to be realized.

One embodiment of this invention is directed to a liquid-gas distributor assembly for a vertical multiple phase contacting column which comprises a horizontal perforated plate extending across the interior of the column, a vertical open-ended cyclindrical-like casing centrally positioned within the column and spaced above said plate, a vertical fluid transfer conduit extending upwardly from said plate into and terminating within said casing, and fluid pervious means for retaining a solid contact mass in a horizontal layer above said casing, said fluid pervious means comprising a centrally positioned perforated conical baffle disposed across the upper end of the casing.

In another embodiment this invention is directed to apparatus for effecting countercurrent two-phase flow in the presence of a solid catalyst, which apparatus comprises a vertical shell having upper fluid inlet and outlet means and lower fluid inlet and outlet means, a plurality of vertically spaced liquid-gas distributor assemblies in the shell, each of said distributor assemblies comprising a horizontal perforated plate extending across the interior of said shell, a centrally positioned perforated conical baffle spaced above said plate, a cyclindrical-like casing depending from said conical baffle, the lower end of said casing being open and spaced above said plate, a vertical fluid transfer conduit extending upwardly from said plate into and terminating within said casing, a perforate particle retaining member extending from the periphery of said conical baffle to the vertical wall of said shell, and a plurality of vertically spaced particle-form catalyst beds in the shell, each of said beds being disposed in a layer supported by the conical baffle and particle retaining member of a corresponding distributor assembly.

The reactor herein described comprises a vertically elongated pressure-tight shell or column in which the catalyst is disposed in a series of vertically spaced relatively thin beds or layers, in contrast to the single bed of sustantial thickness conventionally employed. Liquid or mixed phase charge is introduced to the top or to an intermediate portion of the column and flows downwardly therethrough while a suitable gas is introduced to the bottom portion of the column and flows upwardly and countercurently to the downflowing liquid phase. Liquid effluent is withdrawn from the bottom of the column and offgas is withdrawn from the top thereof. Adjacent catalyst beds are separated by the above-described liquid-gas distributor assemblies which, in addition to providing mechanical support for the catalyst beds, function in combination as liquid collection redistribution zones and gas collection-redistribution zones. Good mechanical distribution of both gas and liquid over the cross-section of the reactor is assured through the formation of a continuous liquid phase and a continuous gas phase between each of the vertically spaced beds. With regard to a given distributor assembly, downflowing liquid is collected from the superjacent catalyst bed and is redistributed across the transverse area of the next subjacent catalyst bed; upflowing gas is collected from the subjacent bed and is redistributed across the transverse area of the next superjacent bed. The vertical spacing of distributor assemblies should be from 0.5 to 5 column diameters and preferably from about 1 to about 2 column diameters; the vertical thickness of each catalyst bed is approximately the same or somewhat less than the distributor spacing. The relative thinness of each of the beds means that channeling of liquid phase has little chance to develop before the liquid leaves the bed and is redistributed to the next lower bed. Similarly, the probability of forming gas pockets within any bed is statistically negligible because of the shortness of the flow path therethrough.

If the charge stock is substantially unvaporized, it may be introduced into the column at the top or at an intermediate feed position; if the charge is partly vaporized, it should then be introduced to an intermediate point of the column. The countercurrent flow within the reactor affords several advantages over conventional cocurrent flow. The upflowing gas stream opposes the downflowing liquid within the catalyst beds and acts to disperse localized accumulations of liquid, thus further reducing the tendency toward channeling. The gas stream further acts as a stripping medium to displace from the downflowing liquid lower boiling components and volatile impurities, which may be present in the original charge stock or formed in situ as a consequence of the catalyzed reaction, and to remove such light ends overhead, thus preventing over-reaction and unnecessarily high space velocities, as well as providing a partly stabilized bottoms.

This invention requires the use of fixed catalyst beds or fixed-fluidized catalyst beds. The physical structure of the catalyst contemplated for use is a particle form catalyst in the shape of spheres, cylinders, saddles, pellets, etc. which have a major dimension of from about $\frac{1}{16}''$ to about 1″ or greater. Since uniform upflow of gas through the vertically spaced catalyst beds is one of the desired objectives of this invention, the catalyst particles should be shaped to avoid trapping gas bubbles as much as possible. The preferred shape for the particles accordingly is spherical. The upward gas velocity may be sufficiently high as to cause the catalyst to exist in the fluidized state, in which case a suitable catalyst retaining screen or grid member may be provided above each of the catalyst beds to prevent interbed transport of catalyst particles and loss of catalyst through the effluent conduits. The chemical nature of the catalyst will, of course, be such as to promote the particular reaction being effected. Generally the catalyst will consist of a catalytic material supported on a porous inorganic refractory oxide support. For hydrocracking reactions, the support may consist of a material having cracking activity such as alumina, silica, silica-alumina, silica-zirconia, alumina-halogen, etc. upon which a material having hydrogenating activity, such as platinum, palladium, nickel, cobalt, molybdenum, etc. is disposed. For straight hydrogenation reactions, catalysts such as platinum, palladium or nickel on silica or silica-alumina may be employed. For the catalytic treatment of crude oil to remove nitrogen, sulfur and metals therefrom, the catalyst may comprise nickel-molybdenum on silica-alumina. Such catalysts are well-known for their respective applications and are given here for illustrative purposes only and not with the intent of limiting the present invention in any manner. The invention herein properly resides in apparatus for carrying out a manipulative method as distinguished from a chemical process and, as such, its operability is independent of the efficacy of the catalyst for promoting a particular reaction.

The charge to the reactor will also be appropriate to the process effected. Where it is desired to effect hydrocracking of hydrocarbon fractions, the charge may be heavy hydrocarbon fractions such as gas oils, heavy gas oils, other heavy distillates or residue fractions. The gas charged to the reactor will be hydrogen or mixtures of hydrogen with other gases such as methane, ethane, carbon monoxide, etc. Where it is desired to treat crude oil, the gas as charged to the reaction zone may serve either as a stripping medium or as a hydrogenation medium and may comprise hydrogen, nitrogen, carbon monoxide, methane, ethane, propane, mixtures of these, and the like.

The structure and arrangement of the present invention may be more clearly understood upon reference to the accompanying drawing, which is presented as illustrative of its preferred construction but is not intended to be limiting upon the broad scope of the invention.

FIGURE 1 of the drawing is a sectional elevation view of a portion of the reactor of this invention, illustrating a typical liquid-gas distributor assembly in detail.

Figure 2:
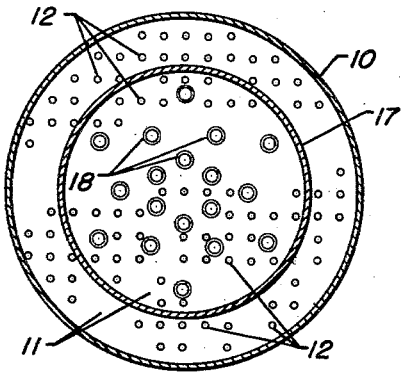

FIGURE 2 of the drawing is a sectional plan view of the reactor taken along line 2—2 of FIGURE 1.

Figure 3:
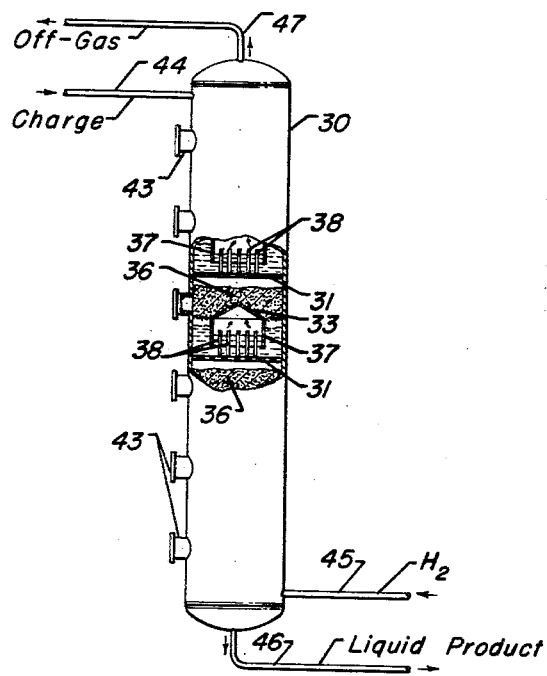

FIGURE 3 of the drawing is a schematic view of a complete reactor including the various process lines connected thereto for introducing reactants and withdrawing effluent.

Referring to FIGURES 1 and 2 in which corresponding parts have the same number, there is shown a portion of the reaction column defined by vertical shell 10; shell 10 of the reactor will usually be cylindrical but may have any shape and will be fabricated to withstand the pressure and temperature conditions that may exist within it. FIGURE 1 illustrates one complete liquid-gas distributor assembly and a portion of the next lower distributor assembly. The distributor assembly comprises a horizontal plate 11 containing perforations 12 which is suitably sealed to the interior of shell 10 so that no appreciable flow of fluid will occur between stages other than through the channels provided. Perforations 12 may be circular or elliptical holes or elongated slots, etc., which are uniformly distributed across plate 11. A centrally positioned conical baffle member 13 containing perforations 14 is spaced above plate 11. Perforations 14 may likewise be circular, elliptical, rectangular, etc. A horizontal annular screen or grid member 15 is disposed between the periphery of baffle 13 and shell 10. A bed of catalyst particles 16 is disposed in the form of a layer across the upper surface of baffle 13 and screen 15, the latter elements providing support for bed 16. Perforations 14 are sufficiently small and screen 15 is of sufficiently fine mesh so that the particles will not drop through these supporting elements. Depending from baffle 13 is a cylindrical open-ended casing 17; the upper rim of casing 17 is suitably sealed to baffle 13 and the lower rim 19 thereof is spaced above perforated plate 11. Casing 17 may have a shape other than cylindrical such as pentagonal, hexagonal, octagonal or other polygonal construction approximating a circular cross-section which is generally symmetrical about the longitudinal axis of shell 10. Conical baffle 13, screen 15, and casing 17 are maintained in fixed position by means of suitable struts, bracework or gusset members which have been omitted from the drawing for the sake of simplicity but whose use and placement will be obvious to those skilled in the art of vessel construction. A number of vertically extended fluid transfer conduit or upcomers 18 are clustered beneath casing 17 and project upwardly from plate 11 through the lower open end of casing 17; conduits 18 extend well above rim 19 but terminate below conical baffle 13.

When the downflowing liquid phase, presently dispersed throughout catalyst bed 16, reaches the bottom of the bed, it is diverted outwardly by conical baffle 13 and flows film-wise onto annular screen 15 through which the liquid passes into the annular passageway or downcomer formed by casing 17 and shell 10. Perforations 14 pass only upflowing gas phase, as hereinafter explained, the pressure differential thereacross being high enough to block liquid flow. A continuous phase 22 accumulates upon plate 11 and passes through perforations 12 into subjacent catalyst bed 16. The height of liquid level above plate 11 is such as to prevent the flow of gas through perforations 12. Meanwhile the upflowing gaseous phase emerges from subjacent bed 16, collects in lower gas pocket 20 below plate 11, and flows through upcomers 18 into upper gas pocket 21 within casing 17. The pressure drop across upcomers 18 is low whereby zone 21 is very nearly at the same pressure as exists in zone 20. Upcomers 18 extend above the liquid level in casing 17 so that there can be no mixing of phases, frothing or liquid carryover. The gaseous phase in zone 21, which is free of liquid droplets, is then distributed by perforate baffle 13 into the upper catalyst bed 16. The free area of baffle 13, that is, the aggregate area of perforations 14, is such that the pressure drop thereacross is substantial, e.g., 1–10 inches of $H_2O$; in this manner, a considerable liquid head may be tolerated above baffle 13 without danger of liquid raining through perforations 14. The difference in pressures within and without casing 17 is manifested by a depressed liquid level within casing 17, which nevertheless provides adequate driving force for urging liquid phase through perforations 12. It may be seen, then, that each distributor assembly functions to form a continuous liquid phase and a continuous gas phase between each of the vertically spaced catalyst beds, to collect downflowing liquid from the superjacent bed and redistribute it uniformly across the transverse area of the subjacent bed, and to collect upflowing gas from the subjacent bed and redistribute it uniformly across the transverse area of the superjacent bed. At the same time, complete interbed phase separation is maintained.

Referring next to FIGURE 3 there is shown a complete reactor of this invention comprising a vertical column 30. Part of the wall of column 30 is cut away to reveal the liquid-gas distributor assemblies which are generally of the same construction as described above, including perforate horizontal baffles 31, perforate conical baffles 33, casings 37 and upcomers 38; a plurality of vertically spaced catalyst beds 36 is supported by corresponding distributor assemblies. Access to the several catalytic zones is provided by way of normally blanked-off manways 43. The reactor may be conveniently loaded with catalyst, as well as unloaded, by rotating the reactor with a power crane into a horizontal position and adding or removing catalyst through manways 43.

For the purpose of illustrating one area of application of the invention and without the intention of limiting it in any way, the use of the apparatus of FIGURE 3 will be described in relation to hydrocracking a residual petroleum fraction to produce low boiling distillates. A liquid charge of reduced crude boiling in excess of 650° F. and obtained by removing all lower boiling material from a petroleum crude is introduced via line 44 into the upper portion of reactor 30. Hydrogen-containing gas is introduced through line 45 into the lower portion of column 30 in an amount sufficient to provide at least 1000 standard cubic feet of hydrogen per barrel of charge. Catalyst beds 36 consist of cobalt and molybdenum deposited upon porus alumina; the catalyst preferably contains about 3% cobalt and about 5% molybdenum by weight in the form of the oxide or sulfide or a mixture thereof. The charge is introduced at a temperature of about 550° F. and the reaction is carried out at a pressure of about 1500 p.s.i. The hydrogen-containing gas flows countercurrently to the downflowing liquid charge, each phase being collected and redistributed between adjacent catalyst beds 36. The upflowing gas stream, in addition to furnishing hydrogen for the hydrogenation reactions, also acts as a stripping medium to remove gasoline, light hydrocarbons ($C_1$–$C_4$ and other fractions) from the reaction zone as they are formed by the cracking reactions. The countercurrent flow further provides a temperature moderating effect which limits the temperature rise inherent in the exothermic process, and affords a maximum degree of saturation and stabilization of products before undesirable thermal reactions such as coking, which may deactivate the catalyst, can occur. A partly stabilized liquid product containing gasoline and distillate fractions is withdrawn from the bottom of column 30 through line 46. The liquid product may be sent to the usual fractionator train from which the various product and recycle cuts may be obtained. Alternatively, this liquid may be recycled to the feed inlet 44, and thus cracked to extinction. The hydrocarbon-rich gas stream is taken from the top of the column through line 47 and sent to suitable separation facilities and compressor means, not here illustrated, from which a recycle hydrogen stream is obtained and returned to line 45 together with make-up hydrogen as required.

It is contemplated that various modifications to the reactor may be made, other than as illustrated, without departing from the scope of the invention. In particular, the plurality of gas upcomers 18 of FIGURE 1 may be replaced with a single centrally positioned upcomer of larger diameter. The baffle member 13 may be a spherical or elliptical segment or other geometrical shape approximating a cone in structure and function and such alternative construction is considered to be embraced within the term "conical baffle." Annular screen 15 may be omitted and conical baffle 13 enlarged to extend completely across the interior of the column, if desired, although in such case it is preferred that the periphery of the baffle be formed into a horizontal lip or shelf to provide liquid directing means such that the downflowing liquid may be properly diverted into the interstage liquid collection zone.

I claim as my invention:

1. In a vertical multiple phase contacting column, a liquid-gas distributor therefor comprising a horizontal perforated plate extending across the interior of the column, a vertical open-ended cylindrical-like casing centrally positioned within the column and spaced above said plate, a vertical fluid transfer conduit disposed over at least one of the perforations in said plate and extending upwardly from said plate into and terminating within said casing, and fluid pervious means for retaining a solid contact mass in a horizontal layer above said casing, said fluid pervious means comprising a centrally positioned perforated conical baffle supported within the column and disposed across the upper end of said casing.

2. In a vertical multiple phase contacting column, a liquid-gas distributor therefor comprising a horizontal perforated plate extending across the interior of the column, a vertical open-ended cylindrical-like casing centrally positioned within the column and spaced above said plate, a plurality of vertical fluid transfer conduits clustered beneath said casing, each of said conduits disposed over at least one of the perforations in said plate and extending upwardly from said plate into and terminating within the casing, and fluid pervious means for retaining a solid contact mass in a horizontal layer above said casing, said fluid pervious means comprising a centrally positioned perforated conical baffle supported within the columns and disposed across the upper end of said casing.

3. In a vertical multiple phase contacting column, a liquid-gas distributor therefor comprising a horizontal perforated plate extending across the interior of the column, a centrally positioned perforated conical baffle supported within the column and spaced above said plate, a cylindrical-like casing depending from said conical baffle, the lower end of said casing being open and spaced above said plate, a vertical fluid transfer conduit disposed over at least one of the perforations in said plate and extending upwardly from said plate into and terminating within said casing, and a perforate particle retaining member extending from the periphery of said conical baffle to the vertical wall of said column.

4. The apparatus of claim 3 further characterized in that said particle retaining member is a horizontal annular screen.

5. In a vertical multiple phase contacting column, a liquid-gas distributor therefor comprising a horizontal perforated plate extending across the interior of the column, a centrally positioned perforated conical baffle supported within the column and spaced above said plate, a cylindrical-like casing depending from said conical baffle, the lower end of said casing being open and spaced above said plate, a plurality of vertical fluid transfer conduits clustered beneath said casing, each of said conduits disposed over at least one of the perforations in said plate and extending upwardly from said plate into and terminating within the casing, and an annular screen member extending between the periphery of said conical baffle and the vertical wall of said column.

6. Apparatus for effecting countercurrent two-phase flow in the presence of a solid catalyst comprising a vertical shell having upper fluid inlet and outlet means and lower fluid inlet and outlet means, a plurality of vertically spaced liquid-gas distributor assemblies in the shell, each of said distributor assemblies comprising:

(1) a horizontal perforated plate extending across the interior of said shell;
(2) a centrally positioned perforated conical baffle supported within the column and spaced above said plate;

(3) a cylindrical-like casing depending from said conical baffle, the lower end of said casing being open and spaced above said plate;
(4) a vertical fluid transfer conduit disposed over at least one of the perforations in said plate and extending upwardly from said plate into and terminating within said casing;
(5) a perforate particle retaining member extending from the periphery of said conical baffle to the vertical wall of said shell;
and a plurality of vertically spaced particle-form catalyst beds in the shell, each disposed in a layer supported by the conical baffle and particle retaining member of a corresponding distributor assembly.

References Cited by the Examiner

UNITED STATES PATENTS

| | | | |
|---|---|---|---|
| 2,606,104 | 8/52 | Hogan et al. | 23—289 |
| 2,675,999 | 4/54 | Bearer | 23—284 X |
| 2,800,432 | 7/57 | Weinrich | 23—288.3 |
| 2,981,677 | 4/61 | Bowles | 23—288 X |

MORRIS O. WOLK, *Primary Examiner.*

GEORGE D. MITCHELL, *Examiner.*